United States Patent [19]

Kanda

[11] Patent Number: 5,673,340
[45] Date of Patent: Sep. 30, 1997

[54] IMAGE PROCESSING APPARATUS FOR PREVENTING OCCURRENCE OF MOIRE IN A RECONSTRUCTED IMAGE

[75] Inventor: Yoshimichi Kanda, Kawasaki, Japan

[73] Assignee: Ricoh Company, Ltd., Tokyo, Japan

[21] Appl. No.: 463,355

[22] Filed: Jun. 5, 1995

Related U.S. Application Data

[60] Continuation of Ser. No. 236,024, May 2, 1994, abandoned, which is a division of Ser. No. 937,088, Aug. 31, 1992, Pat. No. 5,333,211.

[30] Foreign Application Priority Data

Sep. 2, 1991 [JP] Japan ................................. 3-246415

[51] Int. Cl.$^6$ ..................................................... G06T 5/00
[52] U.S. Cl. .......................... 382/250; 382/264; 382/275; 358/454; 358/433
[58] Field of Search .............................. 358/430, 432, 358/433, 463, 454, 533; 348/400; 382/250, 275, 264

[56] References Cited

U.S. PATENT DOCUMENTS

| 4,541,012 | 9/1985 | Tescher | 348/400 |
| 4,827,533 | 5/1989 | Tanaka | 382/54 |
| 5,289,548 | 2/1994 | Wilson et al. | 358/433 |

Primary Examiner—Michael T. Razavi
Assistant Examiner—Jon Chang
Attorney, Agent, or Firm—Lowe, Price, LeBlanc & Becker

[57] ABSTRACT

An image processing apparatus for image compression and decompression in which occurrence of moire in a reconstructed image is eliminated. The apparatus includes an encoder part for encoding an image into a compressed image, and a decoder part for decoding the compressed image into a reconstructed image. The encoder part includes an input part, a predictive coder, a subtracter, an ADCT encoder and a code memory. The predictive coder and subtracter act to remove high-frequency components prior to the calculation of the DCT coefficients by the ADCT encoder, thereby preventing moire in the reconstructed image.

9 Claims, 19 Drawing Sheets

FIG. 5 PRIOR ART
| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |
FIG. 6A PRIOR ART
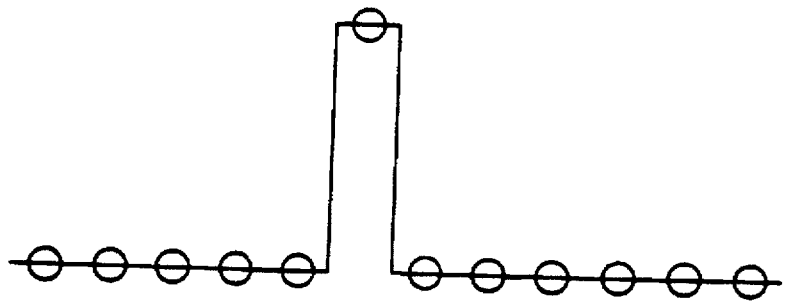
FIG. 6B PRIOR ART
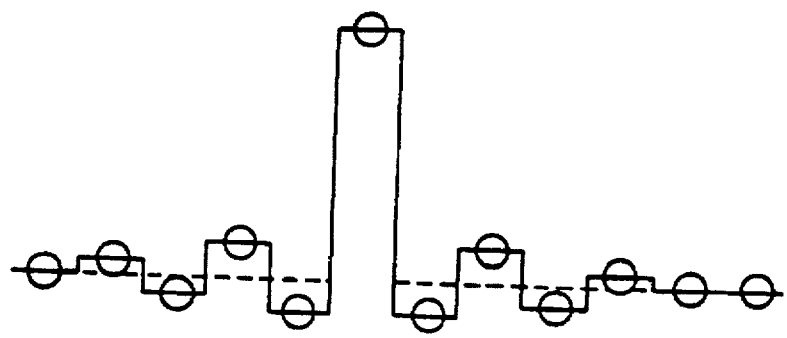

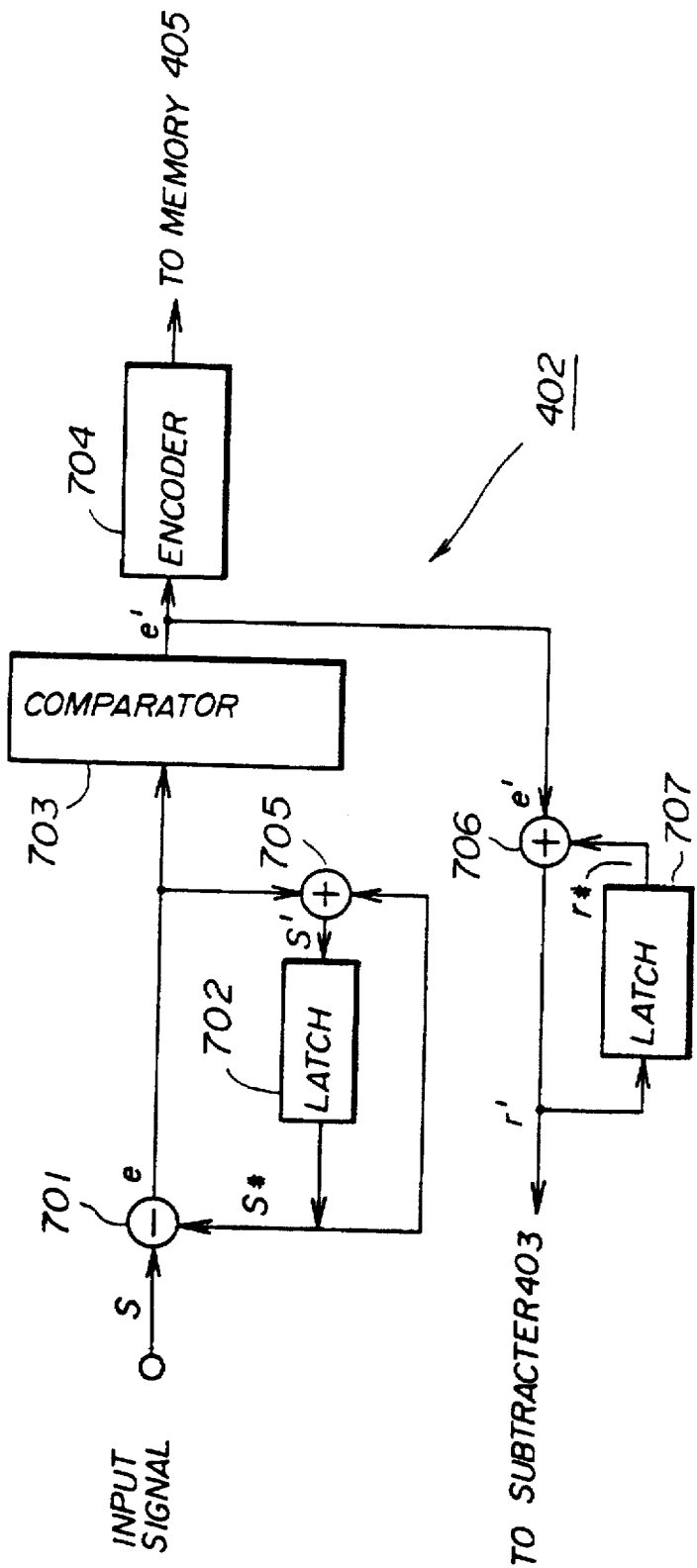
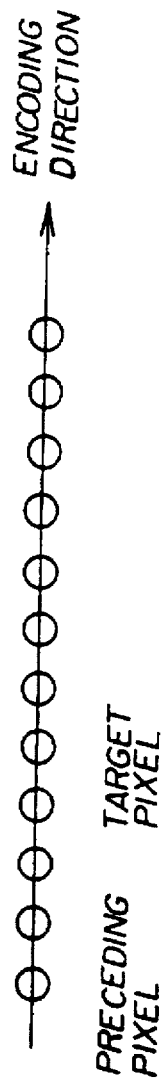
FIG. 8
FIG. 9

DIFFERENCE "e" 10  0  10  -10  120  0  -100  -10  -10  130  -130  0  20  -20

DIFFERENCE "e'" 0  0  0  0  0  120  0  -100  0  0  110  -130  0  0  0

DIFFERENCE  10  0  10  -10  0  0  0  -10  -10  0  0  0  20  -20

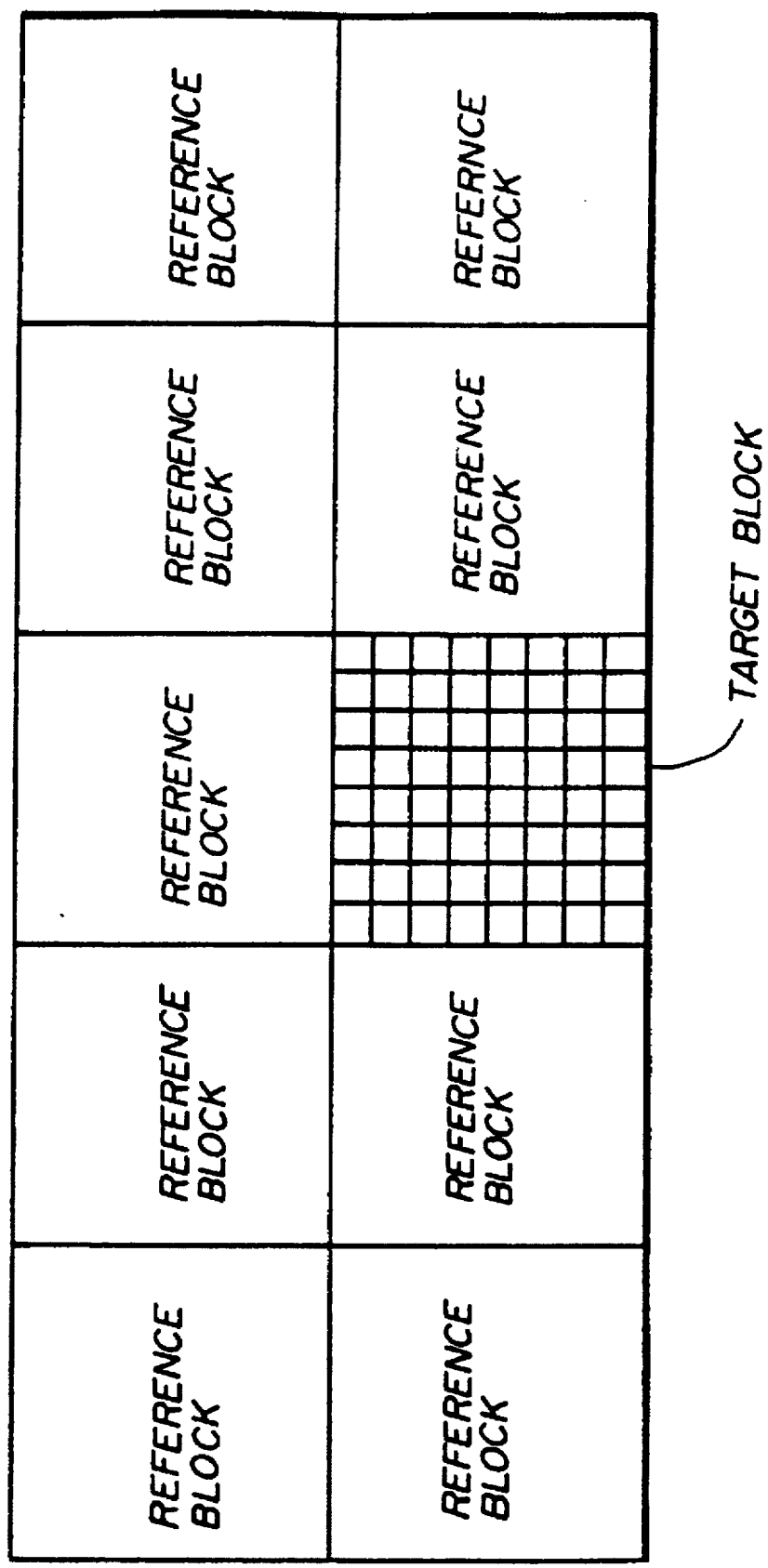

FIG.15

| (0,0) | (1,0) | (2,0) | (3,0) | (4,0) | (5,0) | (6,0) | (7,0) |
|---|---|---|---|---|---|---|---|
| (0,1) | a0<br>(1,1) | (2,1) | (3,1) | (4,1) | (5,1) | (6,1) | (7,1) |
| (0,2) | (1,2) | a1<br>(2,2) | (3,2) | (4,2) | (5,2) | (6,2) | (7,2) |
| (0,3) | (1,3) | (2,3) | a2<br>(3,3) | (4,3) | (5,3) | (6,3) | (7,3) |
| (0,4) | (1,4) | (2,4) | (3,4) | a3<br>(4,4) | (5,4) | (6,4) | (7,4) |
| (0,5) | (1,5) | (2,5) | (3,5) | (4,5) | a4<br>(5,5) | (6,5) | (7,5) |
| (0,6) | (1,6) | (2,6) | (3,6) | (4,6) | (5,6) | a5<br>(6,6) | (7,6) |
| (0,7) | (1,7) | (2,7) | (3,7) | (4,7) | (5,7) | (6,7) | (7,7) |

FIG.16A

| 1 | 2 | 2 | 2 | 1 |
|---|---|---|---|---|
| 2 | 2 | 2 | 2 | 2 |
| 1 | 2 | 2 | 2 | 1 |

| 1 | 2 | 2 | 2 | 1 |
|---|---|---|---|---|
| 2 | 3 | 3 | 3 | 2 |
| 1 | 2 | 2 | 2 | 1 |

| 1 | 2 | 2 | 2 | 1 |
|---|---|---|---|---|
| 2 | 4 | 4 | 4 | 2 |
| 1 | 2 | 2 | 2 | 1 |

| 1 | 2 | 2 | 2 | 1 |
|---|---|---|---|---|
| 2 | 5 | 5 | 5 | 2 |
| 1 | 2 | 2 | 2 | 1 |

| 1 | 2 | 2 | 2 | 1 |
|---|---|---|---|---|
| 2 | 6 | 6 | 6 | 2 |
| 1 | 2 | 2 | 2 | 1 |

| 1 | 2 | 2 | 2 | 1 |
|---|---|---|---|---|
| 2 | 8 | 8 | 8 | 2 |
| 1 | 2 | 2 | 2 | 1 |

× (1/44)

3RD LINE IN u-DIRECTION

3RD LINE IN V-DIRECTION

IMAGE PROCESSING APPARATUS FOR PREVENTING OCCURRENCE OF MOIRE IN A RECONSTRUCTED IMAGE

This is a continuation of U.S. application Ser. No. 08/236,024, filed May 2, 1994 (now abandoned in favor of the present case), which was a divisional of U.S. application Ser. No. 07/937,088, filed Aug. 31, 1992, now U.S. Pat. No. 5,333,211, issued Jul. 26, 1994.

BACKGROUND OF THE INVENTION

The present invention generally relates to an image processing apparatus, and more particularly to an image processing apparatus for image compression and decompression in which occurrence of a moire in a reconstructed image due to an image processing of a screened halftone image is automatically eliminated.

In an image processing apparatus for image compression and decompression, an original image is grouped into a set of blocks, image data of each block is transformed into a set of DCT (discrete cosine transform) coefficients, and the DCT coefficients of each block are quantized so that a compressed image is generated from such quantized DCT coefficients. FIG. 1 shows a conventional image processing apparatus. In the image processing apparatus shown in FIG. 1, image data read by an image reader 101 is encoded into a compressed image by an encoding part 102, and the compressed image is stored in a storage part 106 such as a magnetic disk. The compressed image stored in the storage part 106 is decoded into a reconstructed image by a decoding part 103, and the reconstructed image supplied by the decoding part 103 is processed by an image processor 104. The image supplied by the image processor 104 is output to an output part 105 so that a reproduced image is generated by the output part 105.

The image reader 101 includes a CCD (charge coupled device) image sensor. The image reader 101 reads out an image from an original document by means of the CCD image sensor. In the image reader 101, an analog signal indicating each pixel (picture element) of the image is amplified within a prescribed range, and the analog signal is converted into a digital signal. Also, in the image reader 101, a shading correction process for the digital signal is performed so as to suit the characteristics of an optical system of the image reader and the variations of sensitivity of the CCDs in the CCD image sensor. After the shading correction process is performed, the digital signal is supplied by the image reader 101 to the encoding part 102.

FIG. 2 shows the encoding part 102 of the image processing apparatus shown in FIG. 1. In FIG. 2, a block reader 201 of the encoding part 102 reads out one block from the original image, each block including 64 pixels arranged in 8×8 formation. FIG. 3 shows an original image which is grouped into a set of blocks, each of which includes 64 pixels arranged in 8×8 formation.

A DCT transformer 202 transforms the 64 pixels ($x_{ij}$) of each block of the original image into DCT coefficients ($y_{uv}$) through DCT (discrete cosine transformation). The DCT coefficients $y_{uv}$ are represented by the following equation:

$$y_{uv} = \frac{4 \cdot C(u) \cdot C(v)}{N^2} \sum_{i=0}^{7} \sum_{j=0}^{7} x_{ij} \cdot \cos\left[\frac{(2i+1)u\pi}{2 \cdot N}\right] \cdot \cos\left[\frac{(2j+1)v\pi}{2 \cdot N}\right]$$

where
u=0,1, . . . ,7; v=0,1, . . . ,7;
C(w)=1/2 when w=0;
C(w)=1 when w=1,2, . . . ,7

FIG. 4 shows a set of DCT coefficients of one block. One of the DCT coefficients located at (0, 0) in the block is called a DC component, and this DC component indicates an average of densities of pixels of the block. The remaining 63 DCT coefficients are called AC components, and the AC components include low-frequency coefficients located in upper, left-hand areas of the block, and high-frequency coefficients located in lower, right-hand areas of the block.

In FIG. 4, the AC components of the DCT coeffficients horizontally aligned in a direction (u-direction) indicated by an arrow u in FIG. 4 show changes of densities for pixels arranged in a main scanning direction. The AC components of the DCT coefficients vertically aligned on a line in a direction (v-direction) indicated by an arrow v in FIG. 4 show changes of densities for pixels arranged in a sub scanning direction. Also, the AC components of the DCT coefficients diagonally aligned in the block show changes of densities in which the density changes in the main scanning direction and the density changes in the sub scanning direction overlap each other.

The DCT coefficients output by the DCT transformer 202 shown in FIG. 2 are respectively quantized by a quantizer 203. A quantization matrix table is stored in a table memory 206, and a set of quantization factors are defined in the quantization matrix table. A set of scale factors are adjusted and supplied by a scale factor controller 205. Each of the quantization factors from the table memory 206 is multiplied by each of the scale factors supplied by the scale factor controller 205. The quantizer 203 generates a set of quantized DCT coefficients by using the quantization factors multiplied by the scale factors. Thus, by adjusting the scale factors output by the scale factor controller 205, the quantity of the coded information and the picture quality of the reconstructed image are controlled.

FIG. 5 shows an example of the quantization matrix table stored in the table memory 206. Since the sensitivity of the human eyes is low with respect to an image generated from the high-frequency components of the DCT coefficients, the low-order quantization factors of this quantization matrix table are much smaller than the high-order quantization factors so as to suit the characteristics of the human eyes.

An encoder 204 of the encoding part 102 shown in FIG. 2 performs a modified Huffmann encoding process so that the quantized DCT coefficients output by the quantizer 203 are encoded. In the encoder 204, a relatively short code is generated from each of quantized DCT coefficients which appear more frequently in the image data stream, while a relatively long code is generated from each of quantized DCT coefficients which appear less frequently in the image data stream. The quantity of coded information is reduced in this manner. A compressed image output by the encoder 204 is stored in the storage part 106.

A decoder 208 of the decoding part 103 shown in FIG. 2 performs a modified Huffmann decoding process so that the coded information stored in the storage part 106 is decoded so that the quantized DCT coefficients before the encoding process is performed by the encoder 204 are produced. A dequantizer 209 calculates the DCT coefficients from the quantized DCT coefficients output by the decoder 208, by using the quantization factors from the table memory 206 multiplied by the scale factors from the scale factor controller 205 in the inverse manner to the above mentioned quantizer 203.

An inverse DCT transformer 210 generates a reconstructed image from the DCT coefficients output by the dequantizer 209 through inverse DCT transformation. A block recorder 211 outputs image data of each block of the reconstructed image output by the inverse DCT transformer 210. The image data, output by the inverse DCT transformer 210, is temporarily stored in eight line memories (not shown) each of which corresponds to a line of image data. After the image data is stored in all areas of the line memories, the image data of each line is output to the image processor 104 shown in FIG. 1. The image processor 104 performs the image processing such as a halftone imaging for the image data received from the decoding part 103. The output part 105 records the image supplied by the image processor 104.

Conventionally, when a screened halftone image such as a photograph is processed by the image processor, a moire may appear in a reconstructed image due to the interference between the sampling frequency of the image processing apparatus and the density change frequency of the screened halftone image, thus degrading the picture quality. In order to eliminate the above mentioned problem, a smoothing filter is provided to pre-process the screened halftone image and the image data being pre-processed through the smoothing filter is supplied to the image processor.

When a halftone imaging process such as a dither method, a density pattern method or a sub-matrix method is performed for a halftone dot image such as a photograph in which the density of the original image continuously changes, a reconstructed image having a desirable picture quality can be reproduced by the above image processing apparatus. However, when the halftone imaging process is performed for a bi-level line image such as a character in which the density of the original image sharply changes, a reconstructed image may have a faded outline portion and the picture quality may be seriously degraded. Thus, it is desirable to perform the halftone imaging process only when a halftone dot image is received, and to perform a simple bi-level imaging process without performing the halftone imaging process when a bi-level line image is received. However, there is no suitable method for selectively perform the halftone imaging process and the simple bi-level imaging process in accordance with the kind of the image being received.

In the conventional apparatus described above, the high-frequency components of the DCT coefficients are removed so as to suit the characteristics of the human eyes and the DCT coefficients are quantized in a manner such that the image is efficently compressed. However, when the quantization is performed for an image having a great amount of high-frequency components and the image is compressed at a high compression rate so that the high-frequency components are removed as shown in FIG. 6A, a ringing may appear in a reconstructed image as shown in FIG. 6B, thus degrading the picture quality.

Also, in the conventional apparatus described above, the occurrence of the moire due to the image processing of the screened halftone image is prevented by means of using a smoothing filter. However, it is difficult to select a smoothing filter appropriate for the kind of the image being received. When a smoothing filter appropriate for a screened halftone image having a great number of screened halftone lines is used for a screened halftone image having a small number of screened halftone lines, the occurrence of the moire cannot be prevented and the picture quality of the reconstructed image will be degraded.

SUMMARY OF THE INVENTION

Accordingly, it is a general object of the present invention to provide an improved image processing apparatus in which the above described problems are eliminated.

Another, more specific object of the present invention is to provide an image processing apparatus in which the occurrence of the moire due to image processing of a screened halftone image is automatically eliminated without seriously degrading the picture quality.

Still another object of the present invention is to provide an image processing apparatus in which the occurrence of the ringing due to the image processing of an original image having a great amount of high-frequency factors is automatically eliminated without seriously degrading the picture quality. The above mentioned objects of the present invention are achieved by an image processing apparatus for image compression and decompression in which an image is grouped into a set of blocks, image data of each block being converted into a number of coefficients through discrete cosine transformation, the coefficients being quantized so as to generate a compressed image, and the compressed image being converted into a reconstructed image with respect to each block through dequantization and through inverse discrete cosine transformation, the apparatus includes a smoothing part for smoothing image data of the reconstructed image by using a smoothing filter selected from among a plurality of smoothing filters having different smoothing effects provided therein, an averaging part for producing a set of values of averages of the coefficients with respect to a plurality of blocks in the reconstructed image so that a distribution of the averages of the coefficients for a target block is generated, and a selection part for generating a signal to enable the smoothing part to select the smoothing filter by detecting whether or not one or a plurality of peak values in the distribution of the averages of the coefficients, generated by the averaging part, appear substantially on a diagonal line of the target block passing a lowest-order position through a highest-order position of the target block.

According to the present invention, it is possible to detect whether or not the target block is a screened halftone image so that a select signal is produced to enable an appropriate smoothing filter to be selected from among the plurality of smoothing filters. Also, according to the present invention, the select signal to enable the halftone imaging process to be performed without performing the simple bi-level imaging process is generated when the screened halftone image is received. Thus, it is possible to automatically eliminate the occurrence of the moire or the ringing in the reconstructed image being recorded without degrading the picture quality.

Other objects and further features of the present invention will be apparent from the following detailed description when read in conjunction with the accompanying drawings.

BRIEF DESCRIPTION OF THE DRAWINGS

FIG. 5 is a diagram showing a quantization table used by a quantizer shown in FIG. 2;

FIGS. 6A and 6B are diagrams for explaining occurrence of a ringing due to image processing performed by the conventional apparatus;

FIG. 8 is a block diagram showing a predictive coder part in the apparatus shown in FIG. 7;

FIG. 9 is a diagram for explaining a set of pixels to be processed by the predictive coder shown in FIG. 8;

FIG. 14 is a diagram showing a target block and reference blocks which are used by the filter selector shown in FIG. 12;

FIG. 15 is a diagram showing a set of reference regions of a matrix of the DCT coefficients which regions are used by a discriminator in the filter selector shown in FIG. 12;

FIGS. 16A through 16F are diagrams showing several kinds of smoothing filters, one of which is selected by the filter selector shown in FIG. 12;

DESCRIPTION OF THE PREFERRED EMBODIMENTS

A description will now be given, with reference to FIGS. 7 through 10, of a first embodiment of an image processing apparatus for image compression and decompression according to the present invention.

Figure 7:
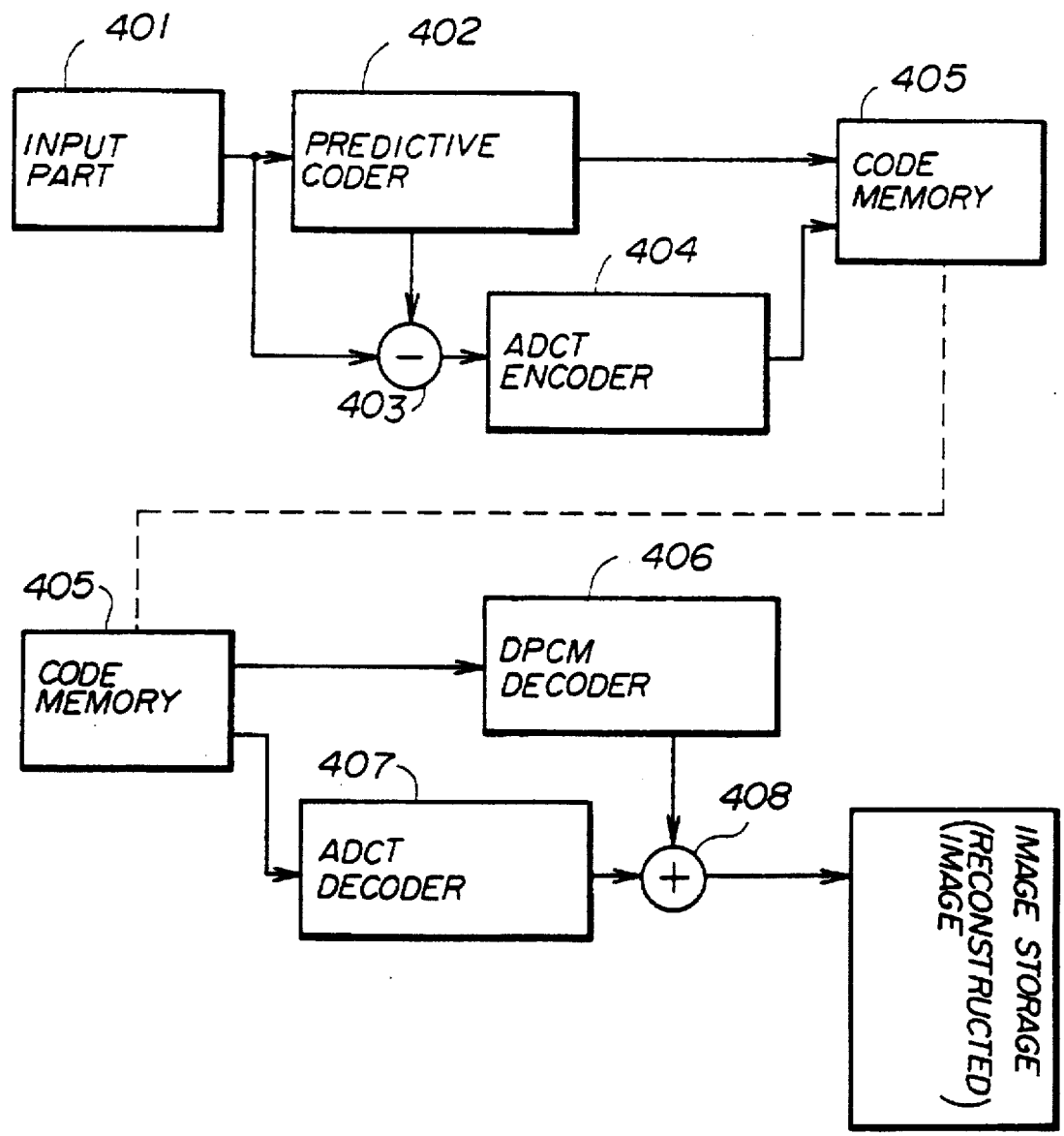
FIG. 7 is a block diagram showing a first embodiment of an image processing apparatus according to the present invention.

FIG. 7 shows the image processing apparatus for image compression and decompression according to the present invention. This image processing apparatus shown in FIG. 7 includes an encoder part for encoding an image into a compressed image, and a decoder part for decoding the compressed image into a reconstructed image. The encoder of the image processing apparatus includes an input part 401, a predictive coder 402, a subtracter 403, an ADCT encoder 404, and a code memory 405. The decoder thereof includes the coder memory 405, a DPCM decoder 406, an ADCT decoder 407, and an adder 408.

The input part 401 of the encoder reads out an image from an original document, placed onto a document board of a digital copier, by means of a CCD line sensor provided in the input part 401. In the input part 401, an analog signal read out by the CCD line sensor is amplified so that the level of the signal lies within a prescribed range, and is converted into a digital signal indicating a pixel in the original image. Also, in the input part 401, a shading correction process of the signal is performed after the conversion of the signal is performed, in accordance with the characteristics of an optical system of the input part and the variations of sensitivity of the CCDs of the CCD line sensor. After the shading correction process is performed, the digital signal is supplied by the input part to the predictive coding part 402.

FIG. 8 shows the construction of the predictive coding part 402. In FIG. 8, the signal which is input to the predictive coding part 402 indicates a density s of a target pixel in the image to be processed. FIG. 9 shows a target pixel and a preceding pixel relative to the target pixel which are aligned on a scanning line of the image to be processed by the predictive coding part 402. In FIG. 8, a subtracter 701 subtracts a density s# of the preceding pixel, held by a latch circuit 702, from the density s of the target pixel so that a difference e (=s−s#) in density between the preceding pixel and the target pixel is computed with respect to each target pixel. A comparator 703 compares the difference e supplied by the subtracter 701 with a predetermined threshold value TH. If the absolute value of the difference e is smaller than the threshold value TH, the comparator 703 outputs the value zero (a first value) to a code generator 704 as a difference e' between the preceding pixel and the target pixel. If the absolute value of the difference e is equal to or greater than the threshold value TH, the comparator 703 outputs a difference e' (a second value) between the preceding pixel and the target pixel, which difference is the same as the difference e supplied by the subtracter 701, to the code generator 704. After the difference e' is received from the comparator 703, the code generator 704 generates differential pulse code modulation (DCPM) code data in accordance with the difference e'. The code data output by the code generator 704 is stored in the code memory 405 shown in FIG. 7.

Also, the difference e in density between the preceding pixel and the target pixel is supplied by the subtracter 701 to an adder 705, and the density s# of the preceding pixel is supplied to the adder 705. Thus, in the adder 705, the density s# of the preceding pixel is added to the difference e in density between the preceding pixel and the target pixel, so that the density s of the target pixel is produced by the adder 705. This density s of the target pixel is held by the latch circuit 702 as a density s' of a new preceding pixel. In a following step, this density s' is received by the subtracter 701 and used to compute a new difference e in density between the new preceding pixel and a next target pixel.

The difference e' output by the comparator 703 is also supplied to an adder 706. In the adder 706, the previous extracted first image data r# of the preceding pixel, held by a latch circuit 707, is added to the difference e' output by the comparator 703, so that the resulting value r' (=e'+r#) is output by the adder 706 to the subtracter 403 shown in FIG. 7. The value r' is then held by the latch circuit 707 for use in the following step in which the value r' is added to a new difference e' supplied by the comparator 703.

Figure 1:
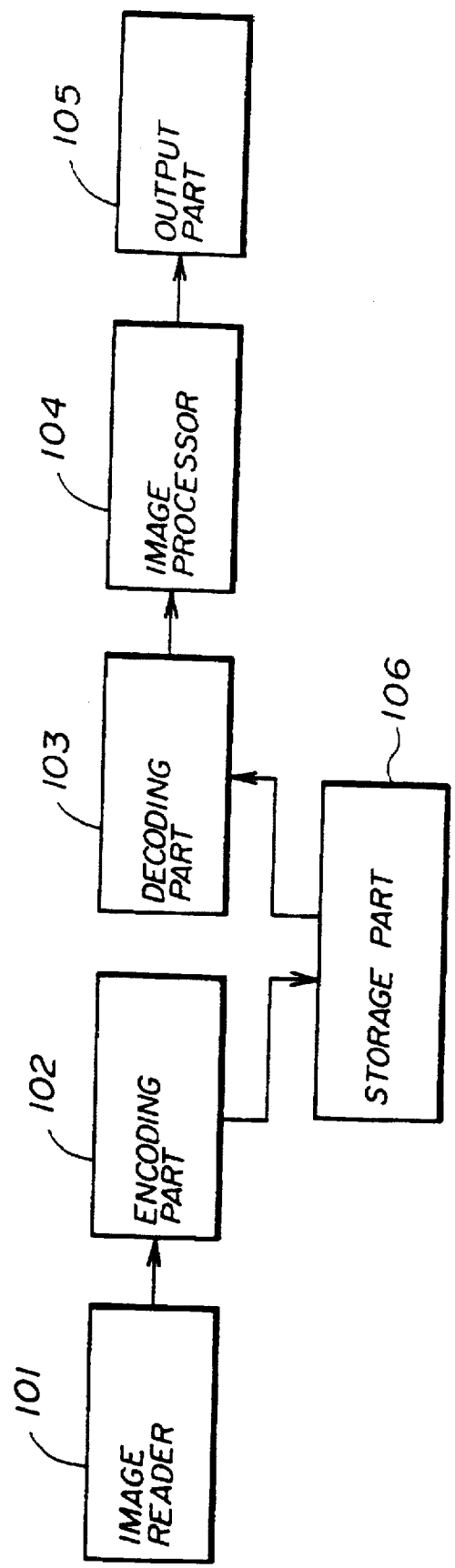
FIG. 1 is a block diagram showing a conventional image processing apparatus.
Figure 2:
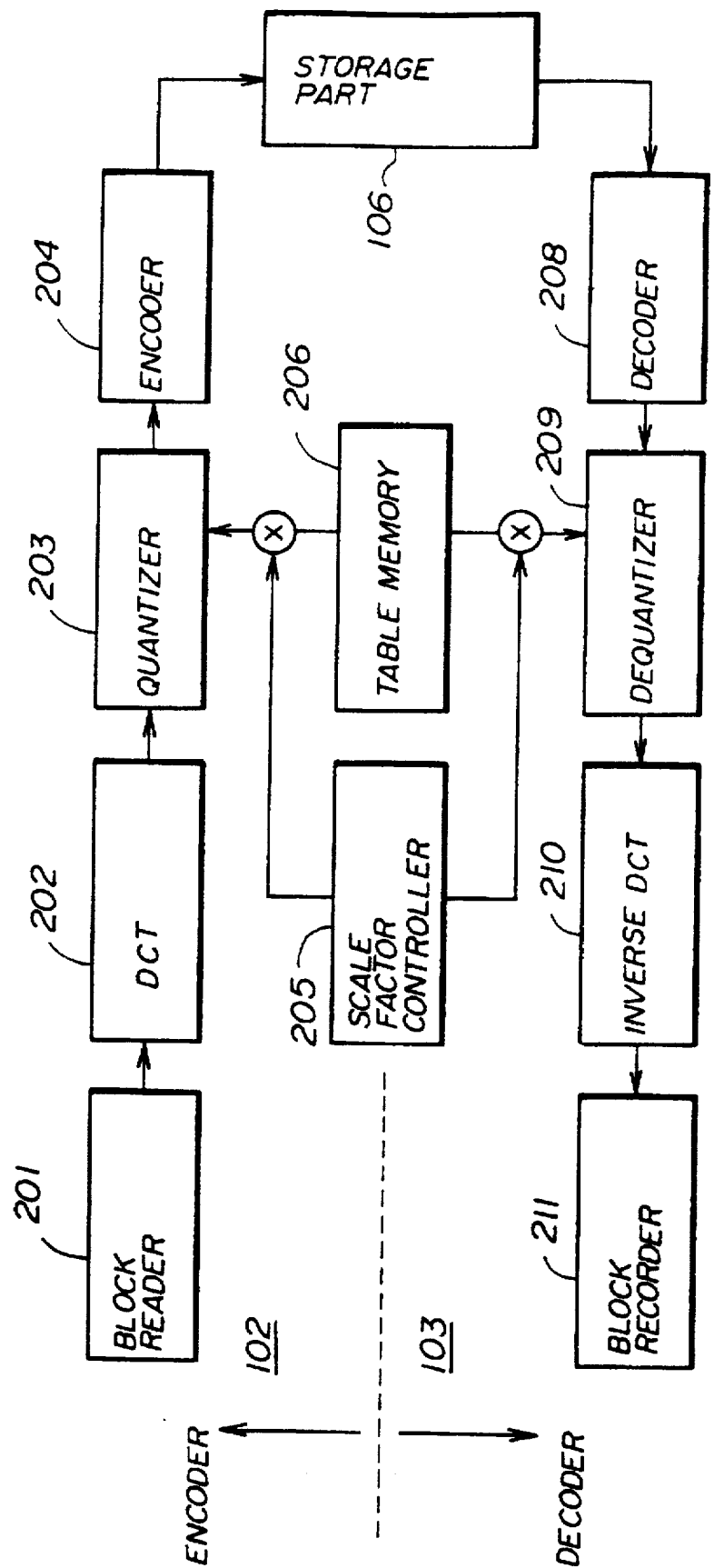
FIG. 2 is a block diagram showing an encoder part and a decoder part of the image processing apparatus shown in FIG. 1.
Figure 3:
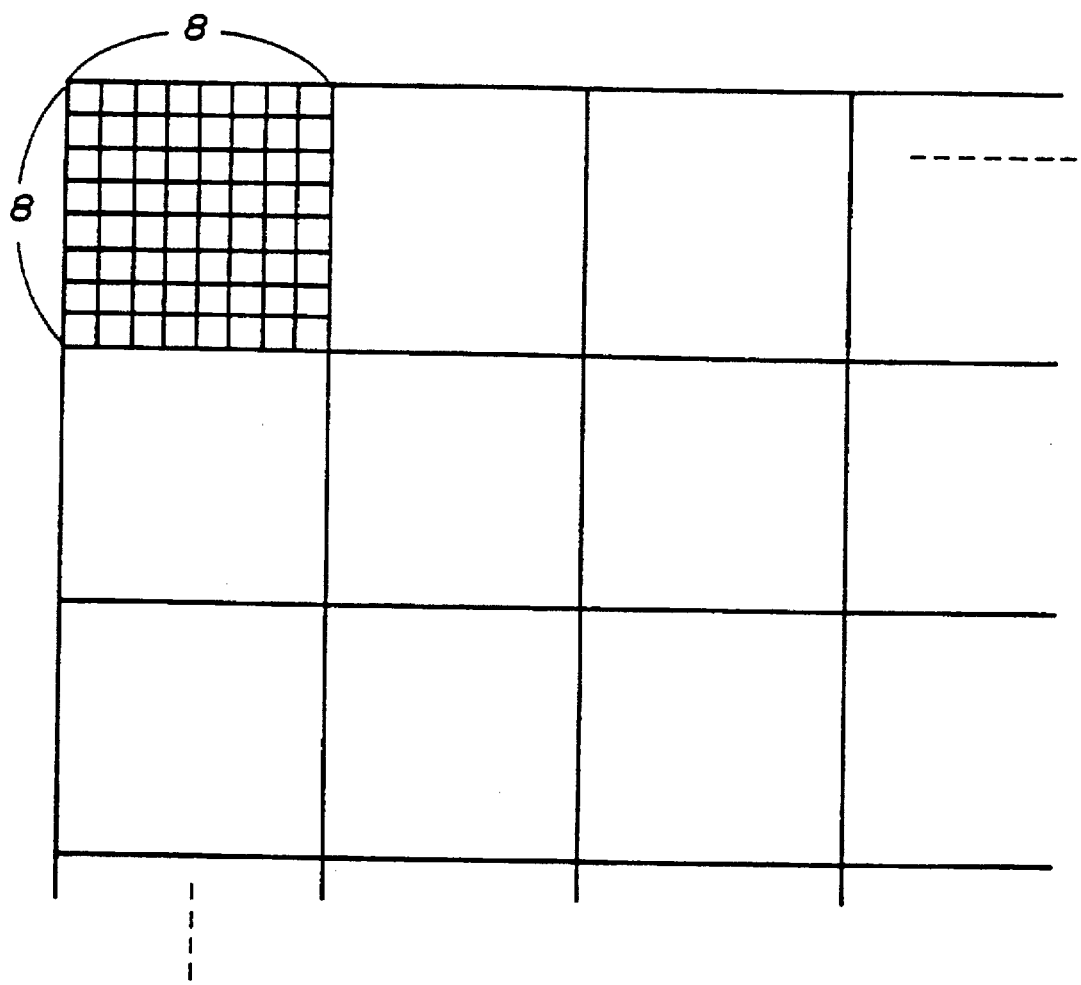
FIG. 3 is a diagram for explaining an image block sampling process performed by a block reader in either the encoder or the decoder shown in FIG. 2.
Figure 4:
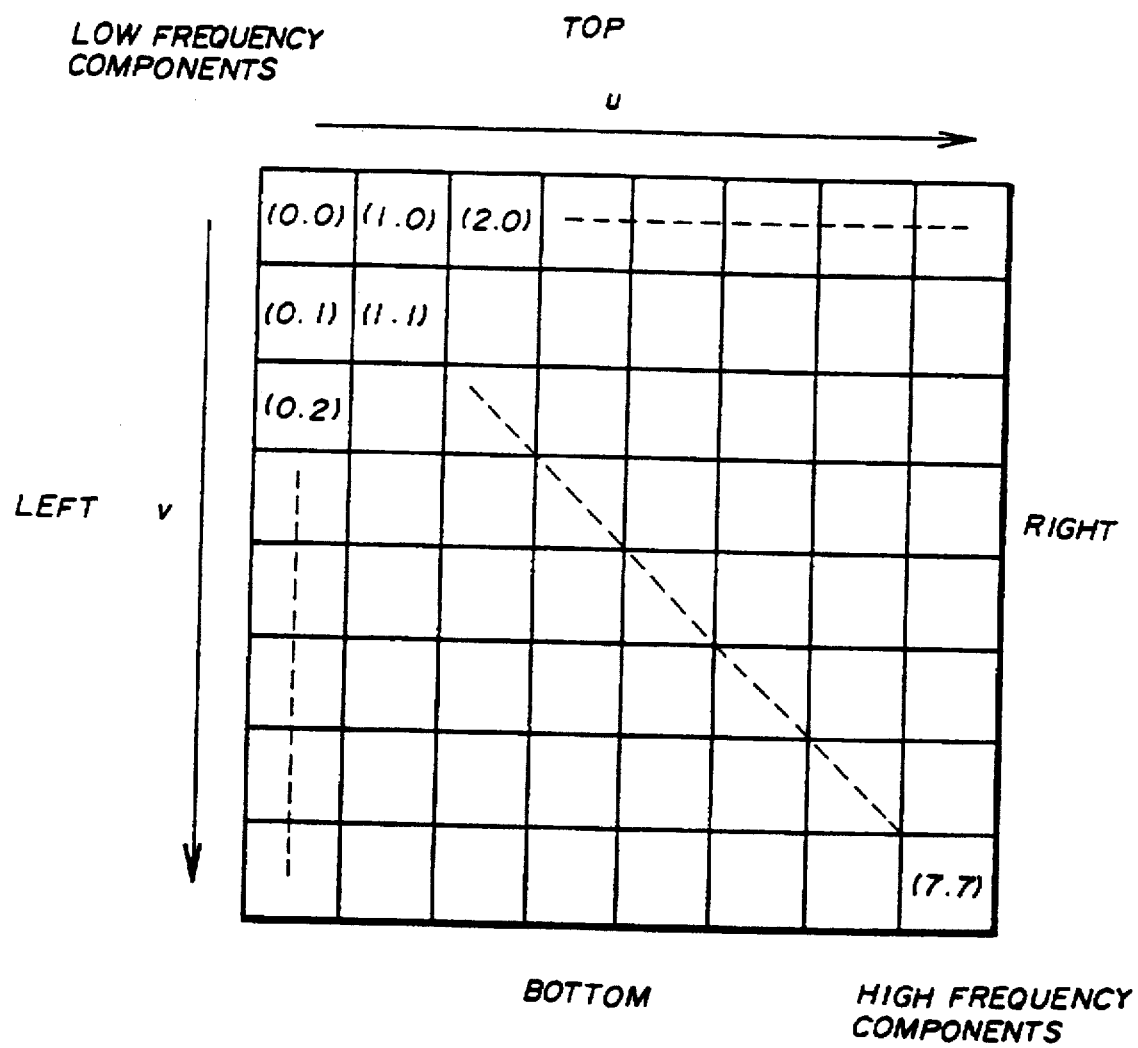
FIG. 4 is a diagram for explaining DCT coefficients produced by the encoder or the decoder shown in FIG. 2.

The subtracter 403 shown in FIG. 7 computes a difference (s−r') between the value r' output by the predictive coder 402 and the original density s of the target pixel output by the input part 401. The difference output by the subtracter 403 is supplied to the ADCT encoder 404. In the ADCT encoder 404, an adaptive discrete cosine transformation is performed so that a set of DCT coefficients are produced with respect to each block. By means of using the predictive coder 402 and the subtracter 403, the high-frequency components are removed prior to calculation of the DCT coefficients, so as to suit the characteristics of the human eyes. As described above in the encoder shown in FIG. 2, the DCT coefficients are quantized by the ADCT encoder 404, so that the quantized DCT coeffiicents are stored in the code memory 405.

In the decoder part of the image processing apparatus shown in FIG. 7, the encoded value of e' read out from the code memory 405 is decoded by the DPCM decoder 406. Also, the encoded and quantized value of (s–r') read out from the code memory 405 is inverse quantized and decoded by the ADCT decoder 407. The adder 408 adds the value (s–r') output by the ADCT decoder 407 to the value of e' output by the DPCM decoder 406 so that the resulting value is transmitted to an external unit or stored in a storage unit.

Figure 10A:
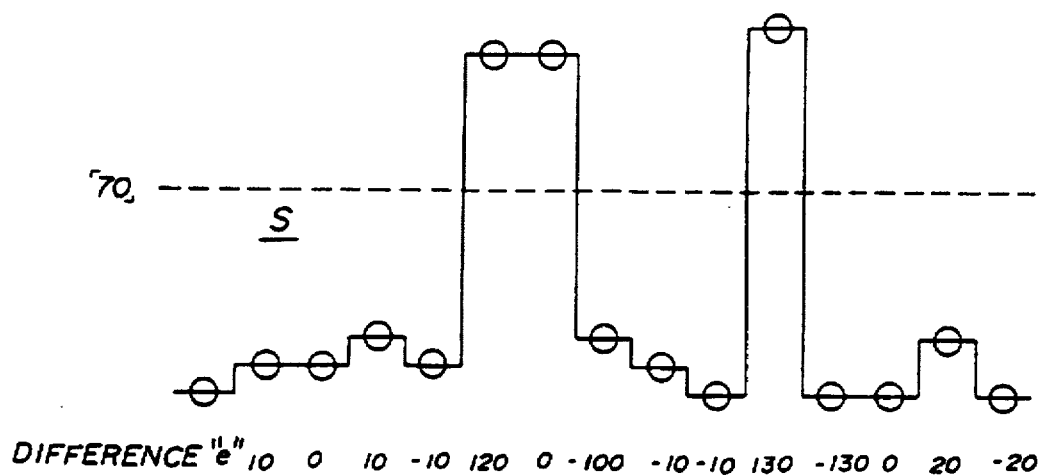
FIGS. 10A through 10C are diagrams for explaining an predictive coding process performed by the predictive encoder shown in FIG. 8.
Figure 10B:
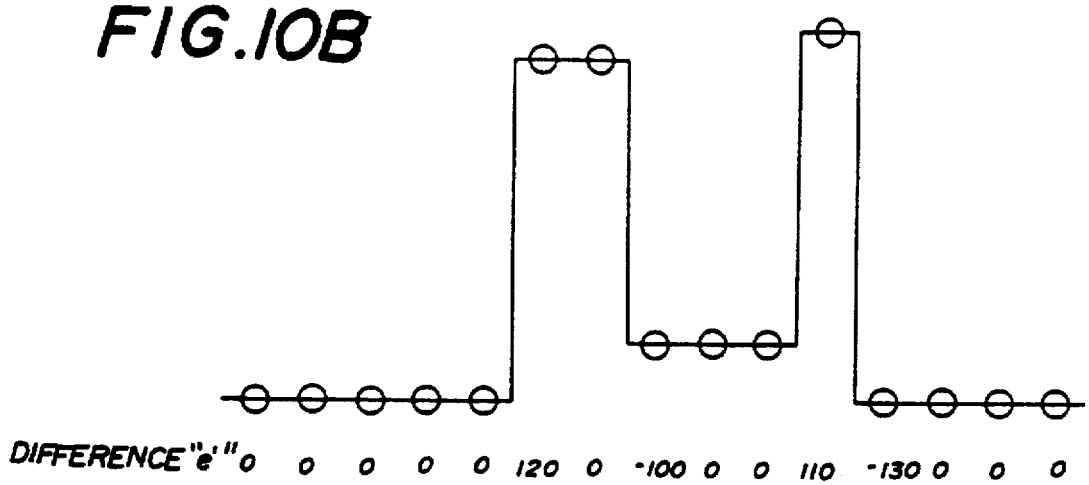

FIG. 10A shows a sequence of differences "e" between the densities s# of respective preceding pixels and the densities s of respective target pixels, which differences are output by the subtracter 701. FIG. 10B shows a sequence of differences "e" output by the comparator 703 with respect to the respective pixels by comparing each of the differences "e" with a predetermined threshold value "70". The code generator 704 carries out an encoding process for an image having a great amount of high-frequency components (corresponding to the differences "e") in which the density level is rapidly changed as shown in FIG. 10B. The results of the encoding process supplied by the predictive coder 402 are stored in the code memory 405.

Figure 10C:
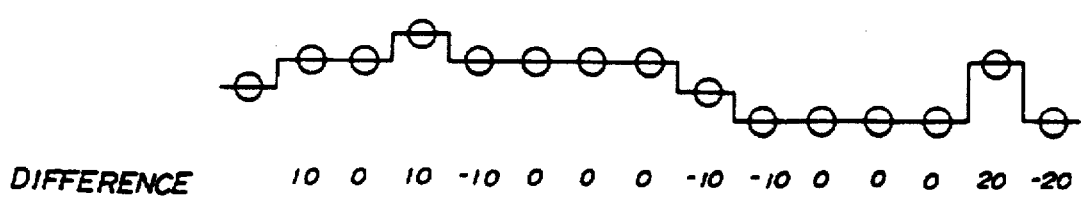

FIG. 10C shows a sequence of differences between the densities of FIG. 10A and the densities of FIG. 10B, which differences are output by the subtracter 403. The ADCT encoder 404 carries out the adaptive discrete cosine transformation with respect to an image in which the density level is gently changed and the high-frequency components are removed as shown in FIG. 10C. The results of the transformation supplied by the ADCT encoder 404 are stored in the code memory 405. Thus, it is possible to eliminate the ringing from appearing in the reconstructed image due to the encoding process performed by the ADCT encoder 404.

Next, a description will be given, with reference to FIGS. 11 through 20, of a second embodiment of the present invention.

Figure 11:
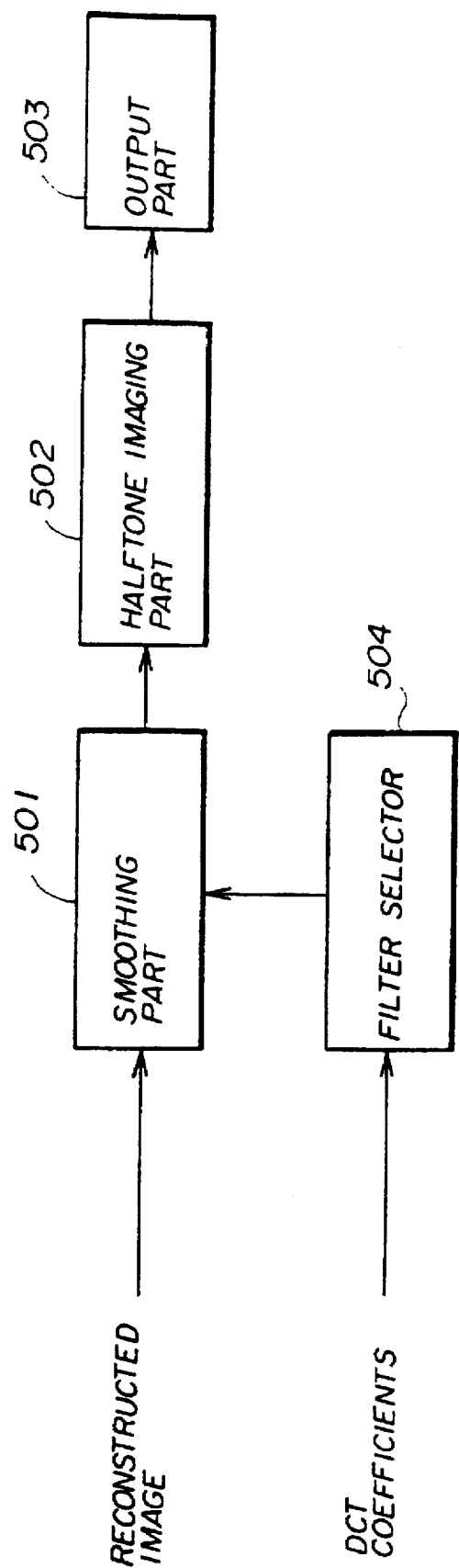
FIG. 11 is a block diagram showing a second embodiment of the present invention.

FIG. 11 shows the construction of the image processing apparatus according to the present invention. In FIG. 11, the encoding part and the decoding part in this image processing apparatus which are the same as those in the image processing apparatus shown in FIG. 7 are omitted. A smoothing part 501 includes a plurality of smoothing filters for eliminating the occurrence of the moire in a reconstruced image produced after the image processing such as a halftone imaging process for a screened halftone image is performed by a halftone imaging part 502. The reconstructed image output by the decoding part is input to the smoothing part 501. One smoothing filter appropriate for the kind of the image to be processed is selected from among the plurality of smoothing filters in the smoothing part 501 in accordance with a select signal output by a filter selector 504. Image data in the reconstructed image is smoothed by means of using a selected smoothing filter of the smoothing part 501, and such image data is subjected to the halftone imaging process performed by the halftone imaging part 502. After the halftone imaging process is performed, the image data is output by the halftone imaging part 502 to an output part 503.

Figure 12:
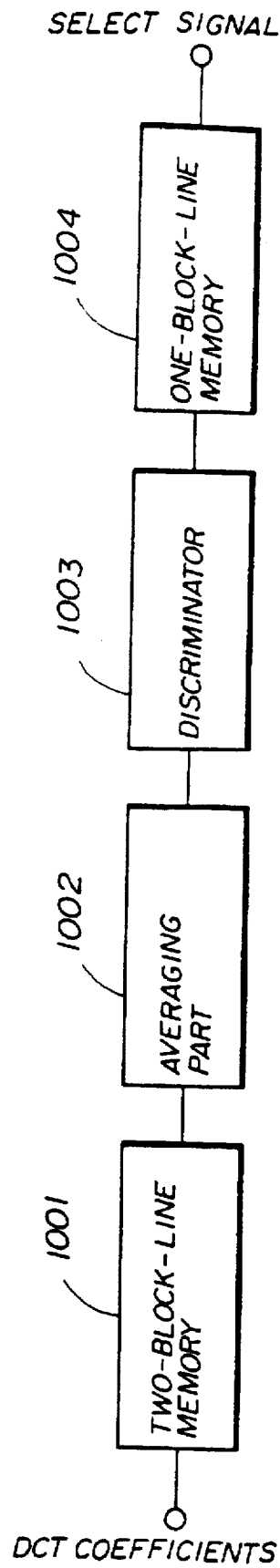
FIG. 12 is a block diagram showing a filter selector in the apparatus shown in FIG. 11.

FIG. 12 shows the construction of the filter selector 504. This filter selector 504 includes a two-block-line memory 1001, an averaging part 1002, a discriminator 1003, and a one-block-line memory 1004. The data of the DCT coefficients output by the decoding part is input to the filter selector 504. By evaluating the DCT coefficients being received, the filter selector 504 outputs a select signal to enable the smoothing part 501 to select an appropriate smoothing filter from among the smoothing filters therein.

Figure 13A:
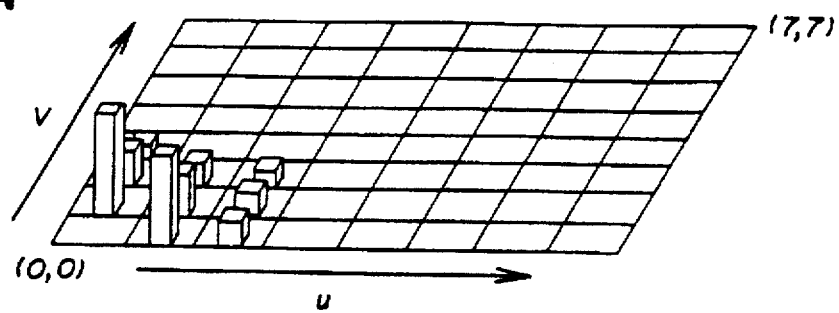
FIGS. 13A through 13D are diagrams for explaining distributions of the averages of the DCT coefficients corresponding to several kinds of images.
Figure 13B:
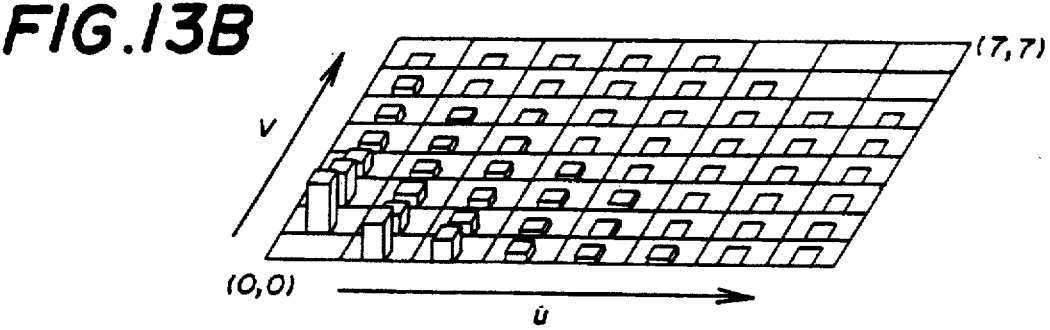

FIG. 13A shows a distribution of the averages of the DCT coefficients (the AC components) with respect to a number of blocks of 8×8 pixels of a halftone image such as a photograph. In the case of FIG. 13A, a discrete cosine transformation is performed with respect to the blocks of the halftone image and then the averages of the DCT coefficients are computed. FIG. 13B shows a distribution of the averages of the DCT coefficients (the AC components) with respect to a number of blocks of 8×8 pixels of a bi-level line image such as a character. The distribution in the case of the bi-level line image shown in FIG. 13B contains a greater amount of high-frequency components of the DCT coefficients than in the distribution in the case of the halftone image shown in FIG. 13A. In both cases of FIGS. 13A and 13B, the values of the averages at high-frequency locations of the block are smaller than those at low-frequency locations thereof.

Figure 13C:
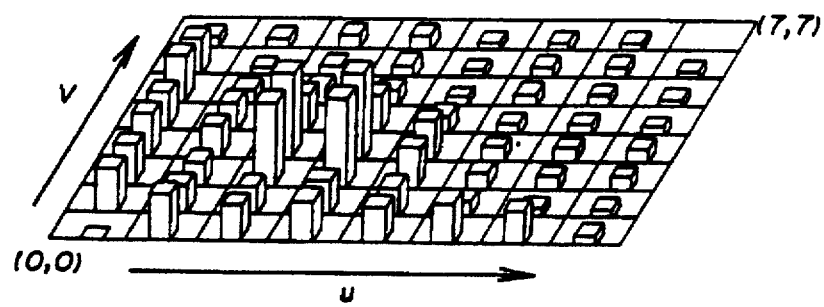
Figure 13D:
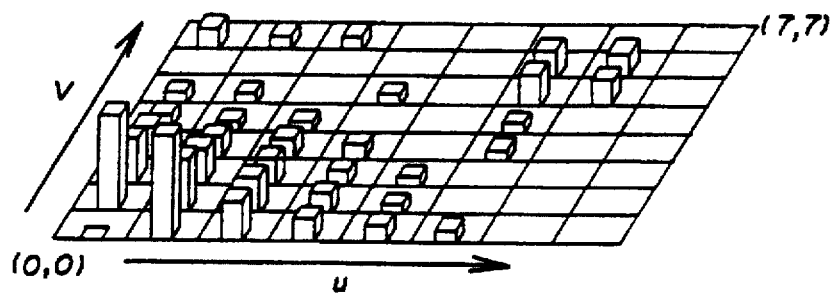

FIGS. 13C and 13D show respectively distributions of the averages of the AC components of the DCT coefficients with respect to a number of blocks of 8×8 pixels when screened halftone images at 100 lpi (lines per inch) and 200 lpi are read by means of a 400 dpi (dots per inch) image scanner and then images are reconstructed therefrom through the encoding and decoding processes. In a case in which screened halftone images are processed, the values of the averages of the DCT coefficients are varied in both the main scanning direction and the sub scanning direction. For this reason, peak values in the distributions shown in FIGS. 13C and 13D appear substantially on a diagonal line of the block passing a location at (0, 0) through a location at (7, 7). The locations of the peak values in the block along the diagonal line are varied depending on the frequency of the screened halftone lines of the image being input.

The data of the DCT coefficients with respect to two lines of blocks (e.g., a total of ten blocks of 8×8 pixels) as shown in FIG. 14 are stored in the two-block-line memory 1001 of the filter selector shown in FIG. 12. From the two-block-line memory 1001, the data of the DCT coefficients in a target block and the data of the DCT coefficients in one of the reference blocks are sequentially read out, and they are input to the averaging part 1002. In the averaging part 1002, the averages of the DCT coefficients (the absolute values thereof) are computed with respect to each set of the target block and one reference block. The results of the averaging (64 values of the averages of each block) are output from the averaging part 1002 to the discriminator 1003.

The discriminator 1003 detects whether or not peak values in the distribution of the averages of the DCT coefficients appear substantially on a diagonal line of the block passing a location at (0, 0) through a location at (7, 7), which feature of the distribution is inherent to a screened halftone image. For example, as shown in FIG. 15, values of the averages in each of regions a1 through a5 of the block aligned the diagonal line passing a position at (0, 0) through a position at (7, 7) are respectively checked by the discriminator 1003 so as to detect whether or not peak values appear in the distribution. The region a1 shown in FIG. 15 contains the averages at positions (2, 2), (3, 2), (2, 3) and (3, 3), the region a2 contains the averages at positions (3, 3), (4, 3), (3, 4) and (4, 4), the regions a3 contains the averages at positions (4, 4), (5, 4), (4, 5) and (5, 5), the region a4 contains the averages at positions (5, 5), (6, 5), (5, 6) and (6, 6), and the region a5 contains the averages at positions (6, 6), (7, 6), (6, 7) and (7, 7). Also, a region a0 of the block contains the averages at positions (1, 1), (2, 1), (1, 2) and (2, 2).

More specifically, in order to detect whether or not the target block as being a screened halftone image, the discriminator 1003 compares the average of four values of the averages of the DCT coefficients in a target region with the average of four values of the averages of the DCT coefficients in a diagonally arrayed low-order region preceding the target region. In the case of FIG. 15, the discriminator 1003 compares the average of four values of the averages in the region a1 with the average of four values of the averages in the preceding region a0, for example. Also, the discriminator 1003 compares the average of four values of the averages in the region a5 with the average of four values of the averages in the preceding region a4, for example.

In the above described manner, the discriminator 1003 detects the target block as being a screened halftone image when the peak values in the distribution of the averages of the DCT coefficients appear substantially on the diagonal line of the block. If the peak values are located at high-order positions along the diagonal line of the block, the discriminator 1003 outputs a select signal to enable the smoothing part 501 to select a smoothing filter having a high smoothing effect from among the plurality of smoothing filters. If the peak values are located at low-order positions along the diagonal line of the block, the discriinator 1003 outputs, with respect to each target region, a select signal to enable the smoothing part 501 to select a smoothing filter having a low smoothing effect from among the smoothing filters. FIGS. 16A through 16E show a plurality of smoothing filters provided within the smoothing part which filters are arranged in descending order of the smoothing effects of the smoothing filters. FIG. 16F shows a smoothing filter intended for the use when a continuous-tone image is processed.

In a certain case, the discriminator 1003 outputs a select signal specifying the smoothing filter shown in FIG. 16E with respect to the region a1, outputs a select signal specifying the smoothing filter shown in FIG. 16D with respect to the region a2, outputs a select signal specifying the smoothing filter shown in FIG. 16C with respect to the region a3, outputs a select signal specifying the smoothing filter shown in FIG. 16B with respect to the region a4, and outputs a select signal specifying the smoothing filter shown in FIG. 16A with respect to the region a5. In this particular case, the smoothing effect of the selected filter at a high-order region is higher than the smoothing effect of the selected filter at a low-order region.

The select signals described above are output by the discriminator 1003 with respect to each target block, and they are stored in the one-block-line memory 1004 shown in FIG. 12. Then, the filter selector 504 outputs the select signal to the smoothing part 501 with respect to each target block so that an appropriate smoothing filter is selected. In the above described embodiment, since an appropriate smoothing filter in the smoothing part 501 is selected according to the characteristics of the screened halftone image, it is possible to eliminate the occurrence of the moire in the reconstructed image.

Figure 17:
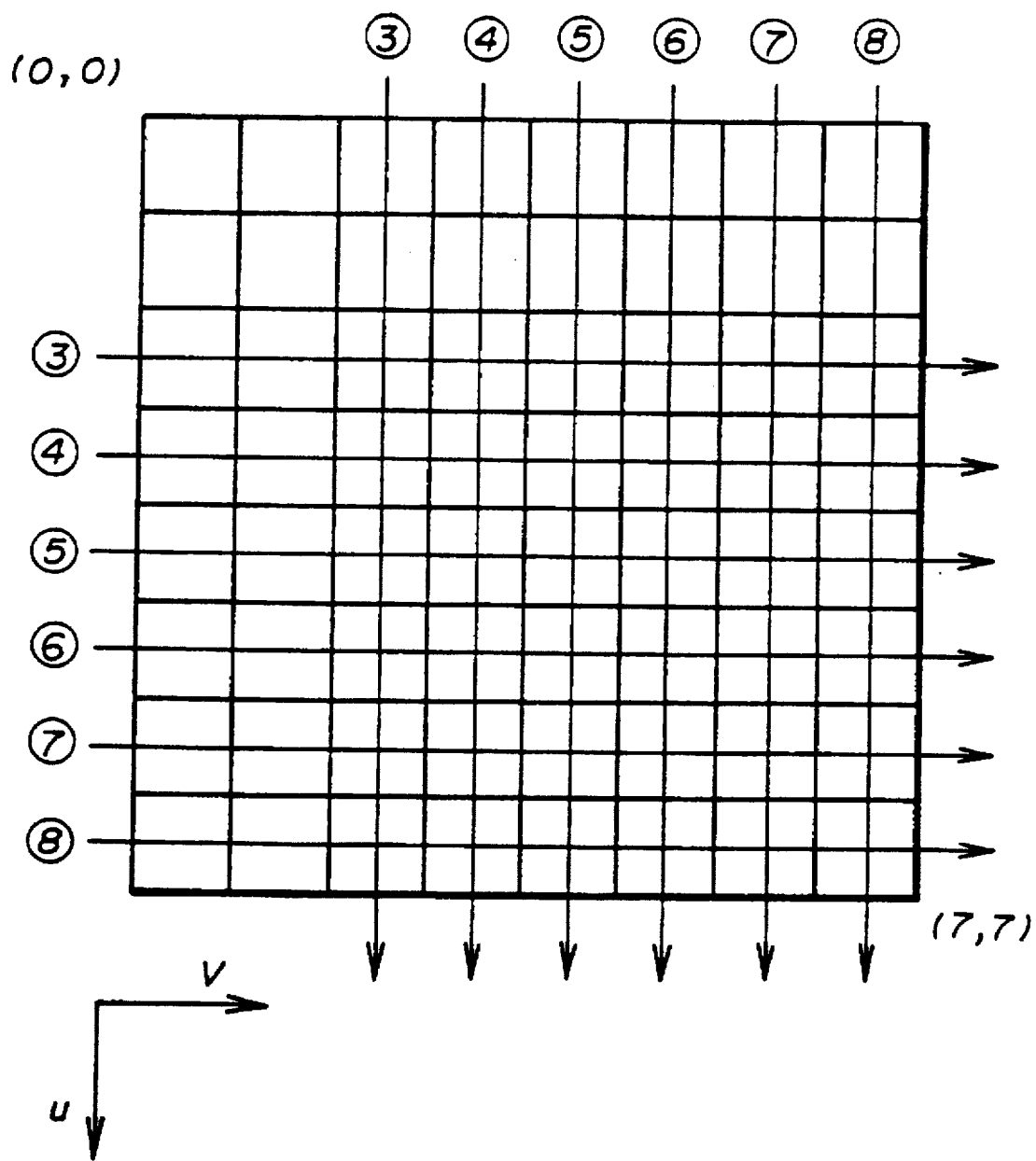
FIG. 17 is a diagram for explaining another discrimination method performed by a discriminator of the filter selector.

FIG. 17 shows another discrimination method to detect whether or not the target block is a screened halftone image. In the filter selector of this embodiment, a discriminator 1003 detects whether or not a value of the average of the DCT coefficients at an n-th position on an n-th vertical scanning line parallel to the u-direction indicated in FIG. 17 is greater than 1.5 times a value of the average of the DCT coefficients at an (n−1)-th position on the same scanning line (where n=3 through 8). At the same time, the discriminator 1003 detects a value of the average of the DCT coefficients at an n-th position on an n-th horizontal scanning line parallel to the v-direction as indicated in FIG. 17 is greater than 1.5 times a value of the average of the DCT coefficints at an (n−1)-th position on the same scanning line.

Figure 18A:
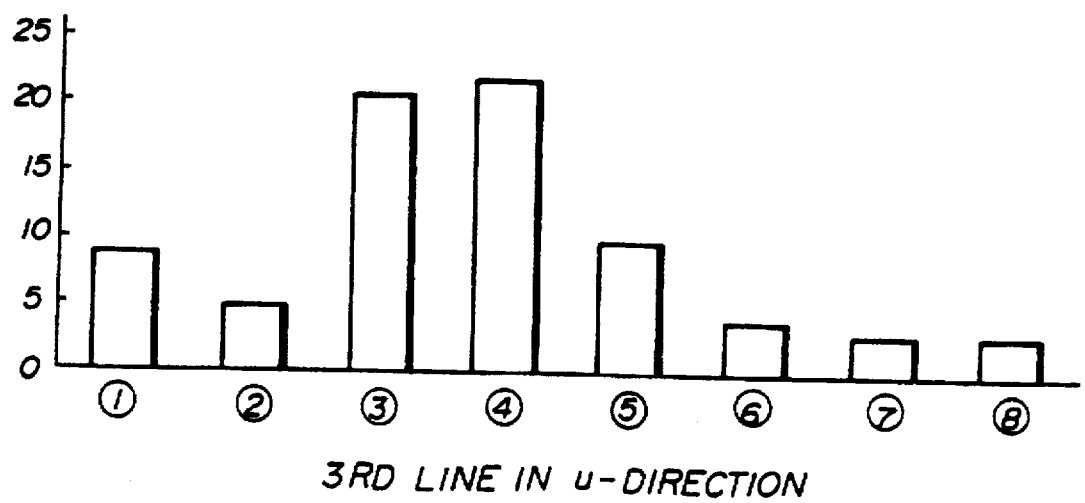
FIGS. 18A and 18B are charts showing the process of the discrimination performed by the discriminator of the filter selector shown in FIG. 17.
Figure 18B:
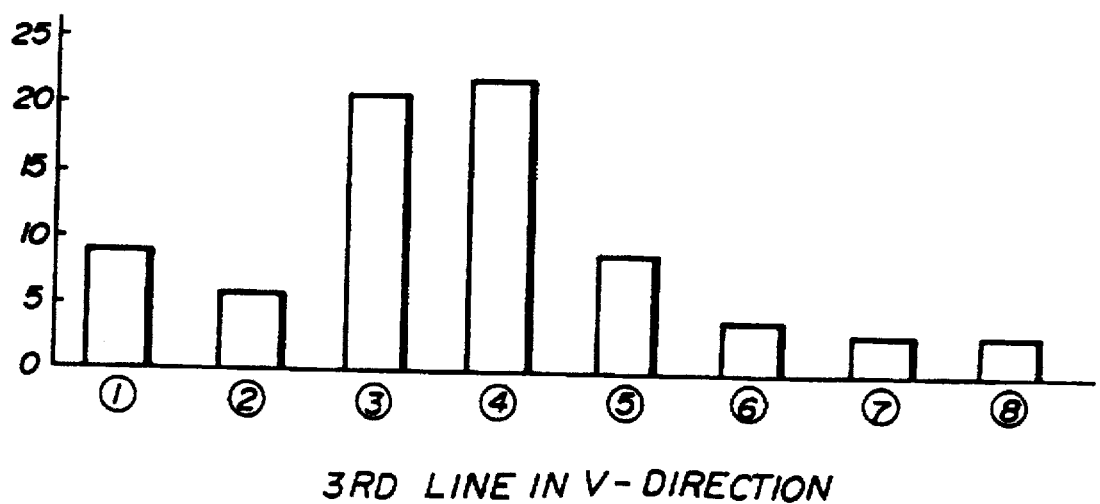

More specifically, in the case of the screened halftone image shown in FIG. 13C, it is detected that the value of the average of the DCT coefficients at the 3rd position on the 3rd scanning line parallel to the u-direction is greater than 1.5 times the value of the average of the DCT coefficients at the 2nd position on the same scanning line as shown in FIG. 18A. It is also detected that the average of the DCT coefficients at the 3rd position on the 3rd scanning line parallel to the v-direction is greater than 1.5 times the value of the average of the DCT coefficints at the 2nd position on the same scanning line, as shown in FIG. 18B. Thus, the filter selector of this embodiment detects, in this case, whether or not the target block is a screened halftone image. Also, it is detected as to which scanning line the peak value exists on.

Figure 19:
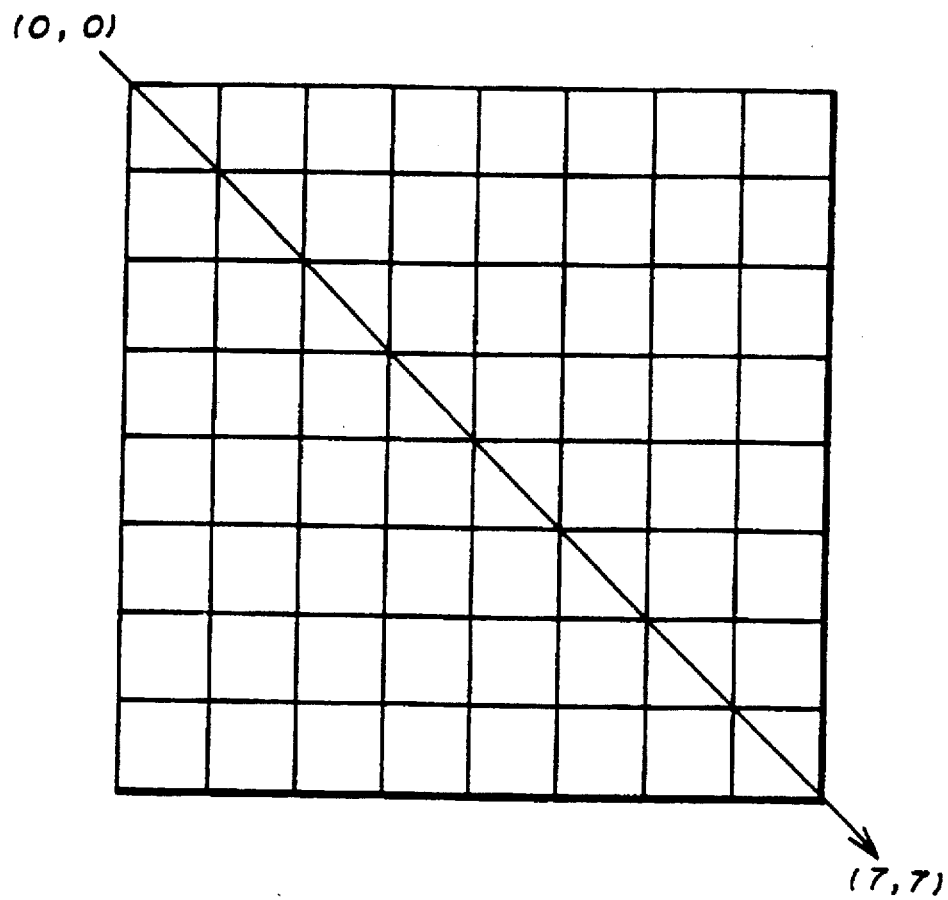
FIG. 19 is a diagram for explaining another discrimination method performed by a discriminator of the filter selector.
Figure 20:
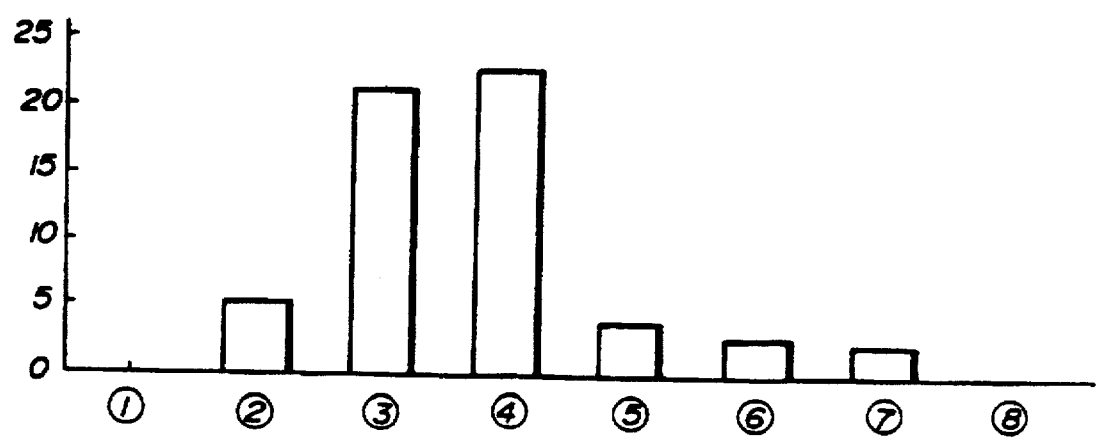
FIG. 20 is a chart showing the process of the discrimination performed by the discriminator in the filter selector shown in FIG. 19.

FIG. 19 shows a still another discrimination method for detecting whether or not the target block is a screened halftone image. In this detecting method, it is detected whether or not a value of the average of the DCT coefficients at a position on a diagonal line of the target block passing (0, 0) through (7, 7) indicated in FIG. 19 is greater than 1.5 times a value of the average of the DCT coefficients at a preceding position on the diagonal line. When the screened halftone image block shown in FIG. 13C is processed, it is detected that the peak value of the DCT coefficient exists at the 3rd position on the diagonal line, as shown in FIG. 20.

Figure 21:
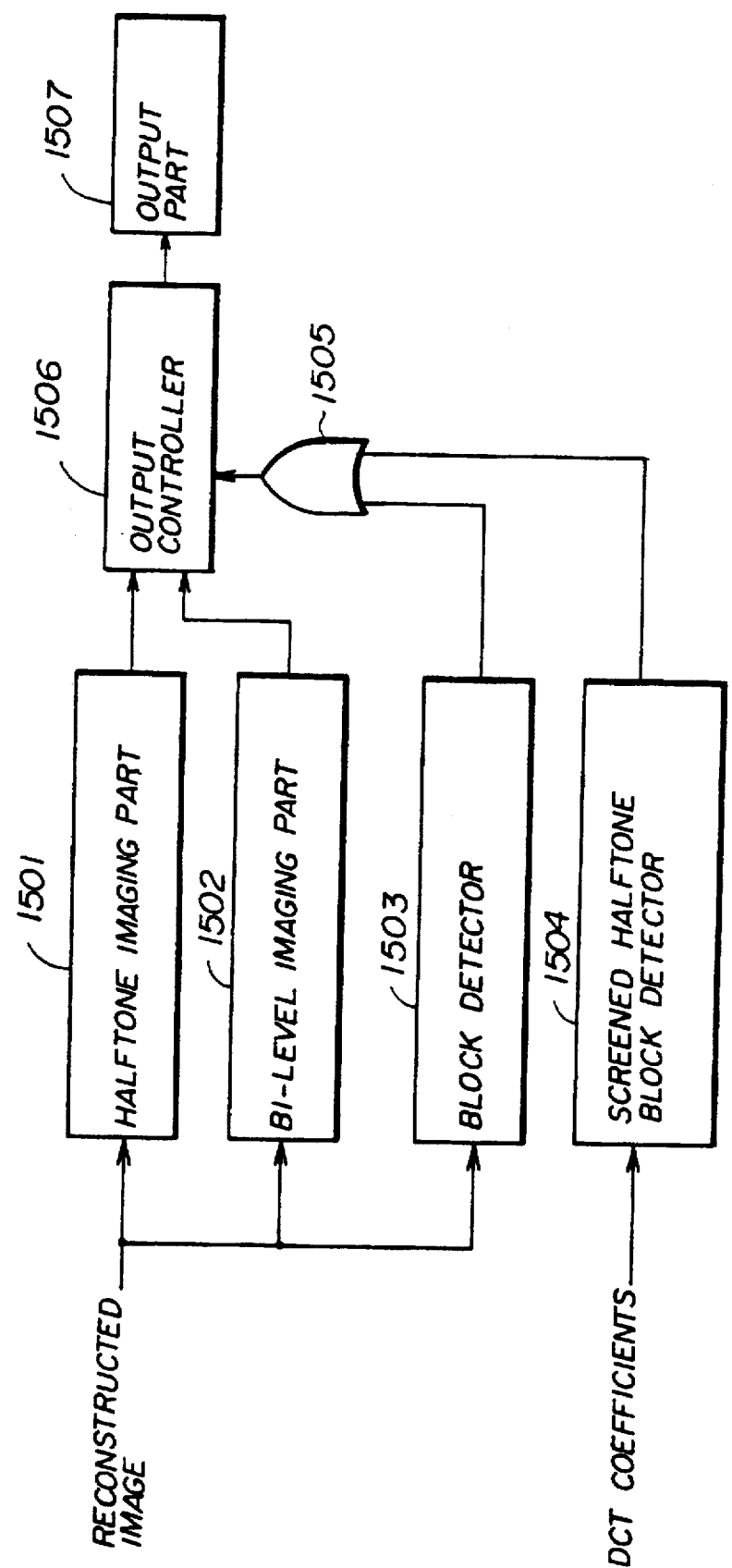
FIG. 21 is a block diagram showing a third embodiment of an image processing apparatus according to the present invention.
Figure 22:
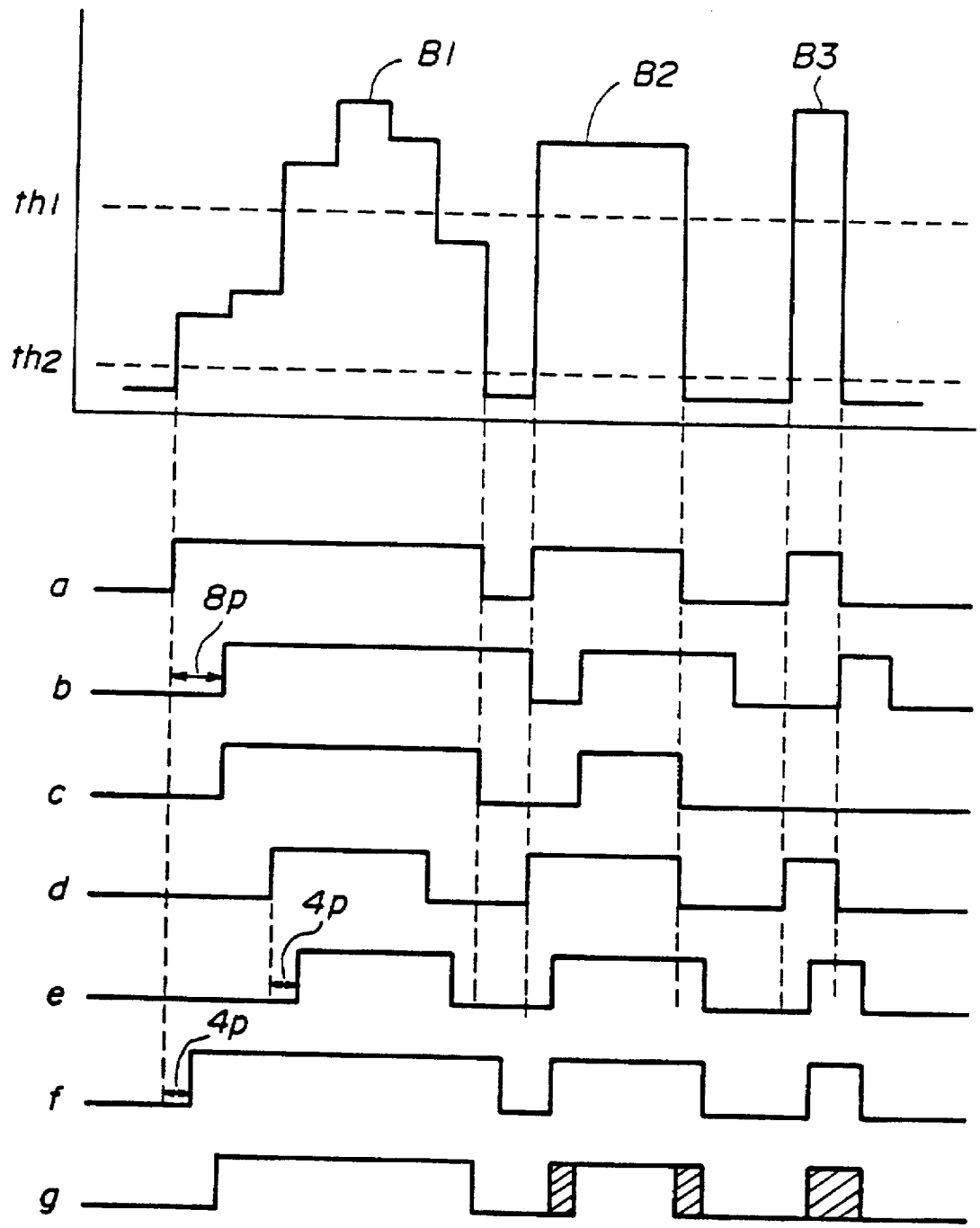
FIG. 22 is a time chart for explaining operations performed by the image processing apparatus shown in FIG. 21.

FIGS. 21 and 22 show a third embodiment of the image processing apparatus of the present invention. In the second embodiment described above, a smoothing filter appropriate for a screened halftone image which has been detected is selected. In the image processing apparatus of the third embodiment, a halftone imaging process is automatically carried out for a reconstructed image data of a screened halftone image which has been detected.

In the image processing apparatus shown in FIG. 21, a halftone imaging part 1501 and a bi-level imaging part 1502 are provided in parallel with respect to the input reconstructed image. The halftone imaging part 1501 performs a halftone imaging process, such as a dither method, a density pattern method or a sub matrix method, for a halftone image block in the input reconstructed image. The bi-level imaging part 1502 performs a bi-level imaging process for a bi-level image block in the input reconstructed image. Image signals are respectively supplied to an output controller 1506 by the halftone imaging part 1501 and the bi-level imaging part 1502, and the reconstructed image after the imaging processes have been performed is output by an output part 1507 under the control by the image controller 1507. The image controller 1506 selectively supplies the image signals to the output part 1507 according to the type of image blocks received from the halftone imaging part 1501 or the bi-level imaging part 1502.

A block detector 1503 of the image processing apparatus shown in FIG. 21 detects whether or not a target block of the reconstructed image is a halftone image. When it is detected that the target block is a halftone image block, a signal indicating a high level "1" is output by the block detector 1503 to the output controller 1506 via an OR circuit 1505. When it is detected that the target block is not, a signal indicating a low level "0" is output by the block detector 1503 to the output controller 1506 via the OR circuit 1505.

A screened halftone block detector 1504 receives data of the DCT coefficients and detects whether or not the target block is a screened halftone image block as described above in the second embodiment. When it is detected that the target block is a screened halftone image block, a signal indicating a high level "1" is output by the screened halftone block detector 1504 to the output controller 1506 via the OR circuit 1505. When it is detected that the target block is not, a signal indicating a low level "0" is output by the screened halftone block detector 1504 to the output controller 1506 via the OR circuit 1505. Only when the output controller 1506 receives a signal indicating a high level "1" which signal is output by the OR circuit 1505, an image signal being processing by the halftone imaging part 1501 is output by the output part 1507.

FIG. 22 shows a detection method performed by the block detector 1503 to detect whether or not the target block is a halftone image block. For the sake of convenience, a case in which image data shown in FIG. 22 is processed will be considered. In the image data shown in FIG. 22, B1 indicates a density level of a halftone image region of an image, B2 indicates a density level of a broad-line region of the image, and B3 indicates a desnity level of a thin-line region of the image. In FIG. 22, th1 indicates a predetermined threshold level used by the block detector 1503 to select the bi-level imaging process being performed by the bi-level imaging part 1502, and th2 (th2<th1) indicates a predetermined threshold level used by the block detector 1503 to select the halftone imaging process being performed by the halftone imaging part 1501.

In FIG. 22, a signal "a" indicating the selection of the bi-level imaging process is produced by comparing a density level of a portion of the input image with the threshold level th2. The signal "a" changes from a low level to a high level each time the density level of the input image is higher than the threshold level th2. A signal "b" is produced from the signal "a" by shifting the phase of the signal "a" by a time duration corresponding to eight pixels "8p" aligned along a main scanning line of the image. A signal "c" indicating a logical conjunction of the signals "a" and "b" is produced therefrom in the halftone imaging part 1501.

A signal "d" indicating the selection of the halftone imaging process is produced in the bi-level imaging part 1502 by comparing a density level of a portion of the input image with the threshold level th1. The signal "d" changes from a low level to a high level each time the density level of a portion of the image is higher than the threshold level th1. A signal "e" is produced in the bi-level imaging part 1502 from the signal "d" by shifting the phase of the signal "d" by a time duration corresponding to four pixels "4p" of the image aligned along a main scanning line. A signal "f" is produced by shifting the phase of the signal "a" by a time duration corresponding to four pixels "4p", and this signal "f" is output by the block detector 1503. The signals "e" and "f" are suitably selected in accordance with the density level of the signal "c", and a signal "g" is thereby produced. Shaded portions of the signal "g" indicate portions of the image signal after the bi-level imaging process is performed by the bi-level imaging part 1502, and other portions thereof indicate portions of the image signal after the halftone imaging process is performed by the halftone imaging part 1501.

Therefore, when a screened halftone image is processed by the image processing apparatus of the third embodiment described above, the screened halftone image is not subjected to the bi-level imaging and it is processed by the halftone imaging part 1501 due to the output controller 1506. Hence, it is possible to automatically eliminate the occurrence of a moire in a reproduced image output by the output part 1507.

Further, the present invention is not limited to the above described embodiments, and variations and modifications may be made without departing from the scope of the present invention.

What is claimed is:

1. An image processing apparatus for processing input image data including a plurality of blocks for image data compression and decompression, each block including respective data of a predetermined number of successive pixels, said image processing apparatus comprising:

a) extraction means having:
      1) an input for inputting the input image data,
      2) a first output for outputting a first value when an absolute value of a difference between respective data of a current pixel and a previous pixel from among the successive pixels of each block in the input image data is not smaller than a predetermined threshold value, and for outputting a second value when the absolute value of the difference is smaller than the threshold value, and
      3) a second outputs b) first coding means, coupled to said first output of said extraction means, for coding each said value output from said extraction means to transform the data of the successive pixels of each block into encoded image data, said encoded image data including first encoded image data produced from said first value and other encoded image data produced from said second value;

c) subtraction means having;
      1) a first input for inputting the input image data,
      2) a second input coupled to said second output of said extraction means, and
      3) an output for outputting second image data for each of the plurality of blocks of the input image data, said second image data being produced by subtracting a sum of each of said values output from said first output of said extraction means and a previous value of the previous pixel output from said first output of said extraction means, from the input image data, said sum being output from said second output of said extraction means; and d) second coding means, coupled to said output of said subtraction means, and including:
      1) means for subjecting each block to a discrete cosine transform to convert the second image data output by said subtraction means into DCT coefficients, said DCT coefficients including no high-frequency components which are produced when the input image data is subject to a discrete cosine transform because the first image data have been subtracted from the second image data; and
      2) means for quantizing the DCT coefficients by dividing the DCT coefficients by each of quantization factors of a quantization table, so that quantized adaptive discrete cosine transform (ADCT) coefficients are output for each of the plurality of blocks of the input image data.

2. An image processing apparatus according to claim 1, further comprising:

memory means for storing the encoded image data output from said first coding means, and for storing the quantized ADCT coefficients output from said second coding means.

3. An image processing apparatus according to claim 1, wherein said extraction means comprises:

means for generating the difference between the respective data of a current pixel and a previous pixel from among the successive pixels of each block in the input image data.

4. An image processing apparatus according to claim 1, further comprising:

means for generating a sum of the value output from the extraction means for the current pixel and a previous version of that value output from the extraction means for the previous pixel, said sum being output to said subtraction means.

5. An image processing apparatus according to claim 1, wherein said extraction means comprises:

comparator means for comparing an absolute value of a difference between respective data of a current pixel and a previous pixel from among the successive pixels of each block of the input image data, with the predetermined threshold value.

6. An image processing apparatus according to claim 1, further comprising:

first decoding means for decoding the encoded image data, output from said first coding means, so as to produce reconstructed first image data;

second decoding means for inverse quantizing the quantized ADCT coefficients of each block, output from said second coding means, to reproduce the DCT coefficients, and for inverse discrete cosine transforming the DCT coefficients so as to output reconstructed second image data; and adding means for adding the reconstructed first image data output from said first decoding means to the reconstructed second image data output from said second decoding means, thereby producing a reconstructed image.

7. An image processing apparatus according to claim 1, wherein said first value is a value of said difference, and the second value is the value zero.

8. An image processing apparatus for processing input image data including a plurality of blocks for image data compression and decompression, each block including respective data of a predetermined number of successive pixels, said successive pixels including a current pixel and a previous pixel, said image processing apparatus comprising:

a) extraction means having:
1) an input for inputting the input image data,
2) a first output for outputting first image data from the input image data, said first image data including high-frequency components which are produced when the input image data is subjected to a discrete cosine transform, and
3) a second output;

b) first coding means, coupled to said first output of said extraction means, for coding said first image data output from said extraction means, so that encoded image data are produced from the first image data for each of the plurality of blocks of the input image data;

c) subtraction means having:
1) a first input for inputting the input image data,
2) a second input coupled to said second output of said extraction means, and
3) an output for outputting second image data for each of the plurality of blocks of the input image data, said second image data being produced by subtracting a sum of each of the first image data output from said first output of said extraction means and a previous value of the previous pixel output from said first output of said extraction means, from the input image data, said sum being output from said second output of said extraction means; and d) second coding means, coupled to said output of said subtractions means, and including:
1) means for subjecting each block to a discrete cosine transform to convert the second image data output from said subtraction means into discrete cosine transform (DCT) coefficients, said DCT coefficients including no high-frequency components which are produced when the input image data is subjected to a discrete cosine transform; and
2) means for quantizing the DCT coefficients by dividing the DCT coefficients by each of the quantization factors of a quantization table, so that quantized adaptive discrete cosine transform (ADCT) coefficients are output for each of the plurality of blocks of the input image data.

9. An image processing apparatus according to claim 8, further comprising:

first decoding means for decoding the encoded image data, output from said first coding means, so as to output reconstructed first image data;

second decoding means for inverse quantizing the quantized ADCT coefficients of each block, output from said second coding means, to reproduce the DCT coefficients, and for inverse discrete cosine transforming the DCT coefficients so as to output reconstructed second image data; and adding means for adding the reconstructed first image data output from said first decoding means to the reconstructed second image data output from said second decoding means, thereby producing a reconstructed image.

* * * * *